United States Patent [19]

Saito et al.

[11] Patent Number: 4,983,678
[45] Date of Patent: Jan. 8, 1991

[54] CURABLE RUBBER COMPOSITION

[75] Inventors: Yoshiomi Saito, Yotukaido; Akio Fujino; Atsumi Ikeda, both of Kawasaki, all of Japan

[73] Assignee: Nippon Zeon Co., Ltd., Tokyo, Japan

[21] Appl. No.: 363,821

[22] Filed: Jun. 9, 1989

[30] Foreign Application Priority Data

Jun. 10, 1988 [JP] Japan ................. 63-143058

[51] Int. Cl.⁵ .............. C08L 9/02; C08L 23/16; C08L 23/26; C08L 33/20
[52] U.S. Cl. ..................... 525/193; 525/233; 525/211; 525/192
[58] Field of Search .................... 525/193, 233

[56] References Cited

U.S. PATENT DOCUMENTS

| | | | |
|---|---|---|---|
| 3,344,105 | 9/1967 | McDonel et al. | 525/193 |
| 3,706,819 | 12/1972 | Asamoto et al. | 525/233 |
| 3,830,881 | 8/1974 | Woods et al. | 525/233 |
| 4,560,729 | 12/1985 | Watanabe et al. | 525/233 |
| 4,576,992 | 3/1986 | Buding et al. | 525/233 |
| 4,692,497 | 7/1987 | Gendreau et al. | 525/263 |
| 4,713,409 | 12/1987 | Hayes et al. | 525/193 |
| 4,843,128 | 6/1989 | Cesare | 525/193 |

*Primary Examiner*—Carman J. Seccuro
*Attorney, Agent, or Firm*—Armstrong, Nikaido, Marmelstein, Kubovcik & Murray

[57] ABSTRACT

Disclosed is a curable rubber composition comprising (a) 100 parts by weight of a rubber comprising 90 to 60% by weight of any ethylenically unsaturated nitrile/conjugated diene type highly saturated rubber and 10 to 40% by weight of an ethylene/propylene copolymer rubber, (b) 10 to 100 parts by weight of a zinc salt of methacrylic acid, and (c) 0.2 to 10 parts by weight of an organic peroxide. The curable rubber composition provides a cured product having an excellent strength, and ozone resistance.

9 Claims, No Drawings

CURABLE RUBBER COMPOSITION

BACKGROUND OF THE INVENTION

(1) Field of the Invention

The present invention relates to a curable rubber composition comprising an ethylenically unsaturated nitrile/conjugated diene type highly saturated rubber composition. More particularly, an ethylenically unsaturated nitrile/conjugated diene type highly saturated rubber composition having an excellent strength and ozone resistance and is useful as the material for a belt, a roll or a hose.

(2) Description of the Related Art

The technique of improving the weatherability and heat resistance by incorporating a rubber having saturated bonds into a rubber having unsaturated bonds is well known.

For example, Japanese Unexamined Patent Publication No. 58-40332 teaches that a co-cured product obtained by curing a mixture of a partially hydrogenated unsaturated nitrile/conjugated diene type rubber and an ethylene/propylene copolymerrubber with sulfar by using a thiuram type accelerator or a dithiocarbamic acid type accelerator has an excellent heat resistance and weatherability. Moreover, Japanese Unexamined Patent Publication No. 61-40342 teaches that a product obtained by peroxidecuring a mixture comprising a substantially saturated hydrocarbon elastomer and a substantially saturated nitrile group-containing elastomer with a peroxide has an excellent thermal aging resistance and ethylene glycol resistance.

However, these rubbers have a problem in that, when they are used for belts, rolls and hoses, the strength is poor.

An ethylenically unsaturated nitrile/conjugated diene type highly saturated rubber has an excellent oil resistance and heat resistance, but this rubber has a poor ozone resistance and thus, cracking is caused by ozone contained in air. Therefore, various troubles occur when this rubber is applied to the above-mentioned uses. Accordingly, development of a rubber material having an excellent strength as well as an excellent heat resistance and ozone resistance has been desired.

SUMMARY OF THE INVENTION

The primary object of the present invention is to provide a curable rubber composition comprising an ethylenically unsaturated nitrile/conjugated diene type rubber, which results in a cured product having an enhanced ozone resistance as well as a high strength.

In accordance with the present invention there is provided a curable rubber composition comprising (a) 100 parts by weight of a rubber comprising 90 to 60% by weight of an ethylenically unsaturated nitrile/conjugated diene type highly saturated rubber and 10 to 40% by weight of an ethylene/propylene copolymer rubber, (b) 10 to 100 parts by weight of a zinc salt of methacrylic acid, and (c) 0.2 to 10 parts by weight of an organic peroxide.

DESCRIPTION OF THE PREFERRED EMBODIMENTS

As the ethylenically unsaturated nitrile/conjugated diene type highly saturated rubber used in the present invention, there can be mentioned a copolymer comprising (a) 10 to 60% by weight of units derived from an ethylenically unsaturated nitrile such as acrylonitrile or methacrylonitrile and (b) 40 to 90% by weight of units derived from a conjugated diene such as 1,3-butadiene, isoprene or 1,3-pentadiene, and a multi-monomer copolymer comprising units derived form the above-mentioned ethylenically unsaturated nitrile and conjugated diene, and (c) units derived from a monomer copolymerizable therewith, such as a vinyl aromatic compound, methacrylic acid, acrylic acid, an alkyl methacrylate having 1 to 18 carbon atoms in the alkyl group, an alkyl acrylate having 1 to 18 carbon atoms in the alkyl group, an alkoxyalkyl methacrylate having 2 to 12 carbon atoms in the alkoxyalkyl group, an alkoxyalkyl acrylate having 2 to 12 carbon atoms in the alkoxyalkyl group, a cyanoalkyl methacrylate having 2 to 12 carbon atoms in the cyanoalkyl group, or a cyanoalkyl acrylate having 2 to 12 carbon atoms in the cyanoalkyl group. As specific examples, there can be mentioned an acrylonitrile/butadiene copolymer rubber, an acrylonitrile/isoprene copolymer rubber, an acrylonitrile/butadiene/isoprene copolymer rubber, an acrylonitrile/butadiene/acrylate copolymer rubber and an acrylonitrile/ butadiene/acrylate/methacrylic acid copolymer rubber. In these rubbers, the content of conjugated diene units is rendered not larger than 30% by weight by means such as partial hydrogenation.

The ethylene/propylene copolymer rubber (EPDM) incorporated in the present invention for improving the ozone resistance is a terpolymer rubber comprising ethylene and propylene at a is polymerization ratio of from 90/10 to 20/80 and further comprising a non-conjugated diene. As the non-conjugated diene, there can be mentioned dicyclopentadiene, methyltetrahydroindene, methylene-norbornene, ethylidene-norbornene and 1,4-hexadiene. Of these, ethylidene-norbornene and dicyclopentadiene are especially preferable. In EPDM obtained by using dicyclopentadiene, the iodine value is preferably at least 20.

The rubber used in the present invention comprises 90 to 60% by weight of the ethylenically unsaturated nitrile/conjugated diene type highly saturated rubber and 10 to 40% by weight of EPDM. If the mixing ratio is outside this range, the intended characteristics of the composition cannot be obtained.

The zinc salt of methacrylic acid used in the present invention is prepared by reacting a zinc compound such as zinc oxide or zinc carbonate with methacrylic acid at a molar ratio of from 0.5/1 to 3/1, preferably from 0.5/1 to 2/1. The prepared metal salt can be used for the preparation of the curable composition of the present invention, or a method can be adopted in which a zinc compound and methacrylic acid are added to the rubber when preparing the composition of the present invention and zinc methacrylate is formed in the composition. Preferably, the zinc compound or zinc methacrylate is one from which coarse particles have been removed, that is one from which coarse particles having a particle diameter of at least 20 $\mu$m have been removed, for example, by air classification. The zinc methacrylate is used in an amount of 10 to 100 parts by weight, preferably 10 to 80 parts by weight, per 100 parts by weight of the rubber.

Any organic peroxide customarily used for the peroxide curing of rubbers can be used in the present invention, without limitation. For example, there can be mentioned dicumyl peroxide, di-t-butyl peroxide, t-butylcumyl peroxide, benzoyl peroxide, 2,5-dimethyl-2,5-di(t-butylperoxy)hexyne-3, 2,5-dimethyl-2,5-di(benzoyloxy)hexane, 2,5-dimethyl-2,5-mono(t-butylperoxy)-hexane, and α,α'-bis(t-butylperoxy-m-isopropyl)benzene. These organic peroxides can be used alone or as a mixture of two or more thereof. In general, the organic peroxide is used in an amount of 0.2 to 10 parts by weight per 100 parts by weight of the rubber. An optimum amount is appropriately determined according to the required values of the physical properties.

The curable rubber composition of the present invention can be prepared by any method, as long as a good dispersion state of the zinc methacrylate is obtained. In general, the curable rubber composition is prepared by mixing the components by a roll, Banbury mixer or kneader customarily used in the rubber industry. When the zinc methacrylate is produced in the composition, preferably a method is adopted in which zinc oxide is uniformly mixed in the composition in advance by a kneader, as mentioned above, and then methacrylic acid is incorporated or absorbed.

In the curable rubber composition of the present invention, various chemicals customarily used in the rubber industry, for example, a reinforcer such as carbon black, a filler such as calcium carbonate or talc, a crosslinking assistant such as triallyl isocyanurate, trimethylolpropane triacrylate or-m-phenylene bismaleimide, a plasticizer, a stabilizer, a processing aid and a colorant, can be in corporated in combination with the above-mentioned components according to the intended object.

The curable rubber composition of the present invention provides a cured product having an excellent strength and ozon resistance, and therefore, is useful as the material for a belt, a roll or a hose.

The present invention will now be described in detail with reference to the following examples. In the examples and comparative examples, all of "parts" and "%" are by weight, unless otherwise indicated.

EXAMPLE 1

A curable rubber composition was prepared according to a recipe (all amounts are expressed by "parts by weight") shown in Table 1, and a cured sheet having a thickness of 2 mm was prepared by press-curing under the curing conditions shown in Table 1. The physical properties and ozone resistance of the cured product were measured, and the results are shown in Table 1.

From the results shown in Table 1, it is seen that if hydrogenated NBR alone is used, a high strength is obtained but the ozone resistance is poor, and that if EPDM alone is used, the ozone resistance is high but the strength is poor. In contrast, the composition comprising both of hydrogenated NBR and EPDM has an excellent strength and ozone resistance.

TABLE 1

|  | Comparative Run 1 | Runs of Present Invention 2 | 3 | 4 | Comparative Run 5 |
|---|---|---|---|---|---|
| Hydrogenated NBR[*1] | 100 | 90 | 80 | 60 | — |
| EPDM[*2] | 0 | 10 | 20 | 40 | 100 |
| Zinc methacrylate[*3] | 30 | 30 | 30 | 30 | 30 |
| Peroxide[*4] | 5 | 5 | 5 | 5 | 5 |
| Curing conditions |  |  |  |  |  |
| Temperature (°C.) | 180 | 180 | 180 | 180 | 180 |
| Time (min) | 20 | 20 | 20 | 20 | 20 |
| Properties of cured product[*5] |  |  |  |  |  |
| Tensile strength (kg/cm$^2$) | 430 | 399 | 398 | 337 | 166 |
| Elongation (%) | 450 | 420 | 420 | 370 | 210 |
| Ozon deterioration test[*6] |  |  |  |  |  |
| 300 hours | Broken | Not observed | Not observed | Not observed | Not observed |
| 1000 hours | — | Not observed | Not observed | Not observed | Not observed |

Note
[*1]Zetpole 2020 supplied by Nippon Geon, acrylonitrile content = 37%, hydrogenation ratio = 90%
[*2]Esprene 505A supplied by Sumitomo Chemical
[*3]supplied by Asada Chemical
[*4]α,α'-bis(t-butylperoxy-m-isopropyl)benzene having a purity of 40% (Peroxymon F-40 supplied by Nippon Oil and Fats)
[*5]according to JIS K-6301
[*6]measured at an ozone concentration of 80 pphm, an elongation of 20% and a temperature of 40° C., and evaluated based on the cracking state Note
(1) Zetpole 2020 supplied by Nippon Geon, acrylonitrile content=37%, hydrogenation ratio=90%
(2) Esprene 505A supplied by Sumitomo Chemical
(3) supplied by Asada Chemical
(4) α,α'-bis(t-butylperoxy-m-isopropyl)benzene having a purity of 40% (Peroxymon F-40 supplied by Nippon Oil and Fats)
(5) according to JIS K-6301
(6) measured at an ozone concentration of 80 pphm, an elongation of 20% and a temperature of 40° C., and evaluated based on the cracking state

EXAMPLE 2

A rubber composition was prepared according to a recipe shown in Table 2, and the composition was press-cured under the curing conditions shown in Table 2 to obtain a cured sheet having a thickness of 2 mm. The physical properties and ozone resistance were determined in the same manner as described in Example 1, and the results are shown in Table 2. In runs 10 through 13, zinc oxide and methacrylic acid were incorporated into the rubber and zinc methacrylate was formed in the rubber.

In all of the runs according to the present invention, excellent ozone resistance and strength were obtained.

TABLE 2

|  | Runs of Present Invention |  |  |  |  |  |  |  |  | Comparative Run |
|---|---|---|---|---|---|---|---|---|---|---|
|  | 6 | 7 | 8 | 9 | 10 | 11 | 12 | 13 | 14 | 15 |
| HNBR*[7] | 70 | 70 | 70 | 70 | 80 | 80 | 80 | 80 | 80 | 100 |
| EPDM*[8] | 30 | 30 | 30 | 30 | 20 | 20 | 20 | 20 | 20 | — |
| Zinc methacrylate*[3] | 20 | 30 | 40 | — | — | — | — | — | — | — |
| Zinc methacrylate*[9] | — | — | — | 40 | — | — | — | — | 40 | 40 |
| Zinc oxide*[10] | — | — | — | — | 20 | 20 | 20 | 50 | — | — |
| Methacrylic acid | — | — | — | — | 10 | 20 | 40 | 20 | — | — |
| Peroxide*[4] | 5 | 5 | 5 | 5 | 5 | 5 | 5 | 5 | 5 | 5 |
| Curing conditions |  |  |  |  |  |  |  |  |  |  |
| Temperature (°C.) | 180 | 180 | 180 | 180 | 180 | 180 | 180 | 180 | 180 | 180 |
| Time (min) | 15 | 15 | 15 | 15 | 15 | 15 | 15 | 15 | 15 | 15 |
| Properties of cured product |  |  |  |  |  |  |  |  |  |  |
| Tensile strength (kg/cm$^2$)*[5] | 331 | 363 | 391 | 427 | 367 | 420 | 371 | 389 | 440 | 463 |
| Elongation (%)*[5] | 410 | 390 | 370 | 420 | 420 | 430 | 390 | 400 | 430 | 450 |
| **Ozon deterioration test*[6]** |  |  |  |  |  |  |  |  |  |  |
| 1000 hours | Not observed | Not observed | Not observed | Not observed | Not observed | Not observed | Not observed | Not observed | Not observed | Broken |

Note
*[7] Zetpole 2010 (supplied by Nippon Geon, hydrogenation ratio = about 95%, acrylonitrile content = 37%
*[8] JSREP 02P supplied by Japanese Synthetic Rubber
*[9] obtained by adding 200 g of zinc oxide to 500 ml of toluene, adding 200 g of methacrylic acid dropwise to the mixture with stirring, aging the mixture a whole day and night, filtering the aged mixture, drying the recovered solid at 60° C. under a reduced pressure, pulverizing the solid and removing particles having a diameter of at least 20 μm by an air classifier (Classifier Model 100 MZR supplied by Alpine)
*[10] zinc oxide No. 1 supplied by Seido Kagaku Note
(7) Zetpole 2010 (supplied by Nippon Geon, hydrogenation ratio=about 95%, acrylonitrile content=37%
(8) JSREP 02P supplied by Japanese Synthetic Rubber
(9) obtained by adding 200 g of zinc oxide to 500 ml of toluene, adding 200 g of methacrylic acid dropwise to the mixture with stirring, aging the mixture a whole day and night, filtering the aged mixture, drying the recovered solid at 60° C. under a reduced pressure, pulverizing the solid and removing particles having a diameter of at least 20 μm by an air classifier (Classifier model 100 MZR supplied by Alpine)
(10) zinc oxide No. 1 supplied by Seido Kagaku

We claim:

1. A curable rubber composition comprising (A) 100 parts by weight of a rubber comprising 90 to 60% by weight of an ethylenically unsaturated nitrile/conjugated diene type highly saturated rubber in which the content of conjugated diene is rendered not larger than 30% by weight by hydrogenation and 10 to 40% by weight of an ethylene/propylene copolymer rubber, (B) 10 to 100 parts by weight of a zinc salt of methacrylic acid, and (C) 0.2 to 10 parts by weight of an organic peroxide.

2. A curable rubber composition according to claim 1, wherein said ethylenically unsaturated nitrile/conjugated diene type highly saturated rubber (A) is a hydrogenation product of a copolymer comprising (a) 10 to 60% by weight of units derived from an ethylenically unsaturated nitrile, (b) 40 to 90% by weight of units derived from a conjugated diene, and (c) the balance of units derived from an optional ethylenically unsaturated monomer copolymerizable with the nitrile (a) and the diene (b).

3. A curable rubber composition according to claim 2, wherein the ethylenically unsaturated nitrile (a) is acrylonitrile or methacrylonitrile.

4. A curable rubber composition according to claim 2, wherein the conjugated diene (b) is 1,3-butadiene, isoprene or 1,3-pentadiene.

5. A curable rubber composition according to claim 2, wherein the copolymerizable ethylenically unsaturated monomer (c) is selected from the group consisting of vinyl aromatic compounds, methacrylic acid, acrylic acid, alkyl methacrylates, the alkyl group of which has 1 to 18 carbon atoms, alkyl acrylates the alkyl group of which has 1 to 18 carbon atoms, alkoxyalkyl methacrylates, the alkoxyalkyl group of which has 2 to 12 carbon atoms, alkoxyalkyl acrylates, the alkoxyalkyl group having 2 to 12 carbon atoms, cyanoalkyl methacrylates, the cyanoalkyl group of which has 2 to 12 carbon atoms, and cyanoalkyl acrylates, the cyanoalkyl group of which has 2 to 12 carbon atoms.

6. A curable rubber composition according to claim 1, wherein the ethylene/propylene copolymer rubber is a terpolymer comprising units derived from ethylene, units derived from propylene, and units derived from a non-conjugated diene; the proportion of the ethylene to the propylene being 90/10 to 20/80 by weight.

7. A curable rubber composition according to claim 6, wherein the non-conjugated diene is selected from the group consisting of dicyclopentadiene, methyltetrahydroindene, methylene-norbornene, ethylidene-norbornene and 1,4-hexadiene.

8. A curable rubber composition according to claim 1, wherein said zinc salt of methacrylic acid (B) is in the form of particles but does not contain coarse particles having a diameter of 20 μm or larger.

9. A curable rubber composition according to claim 1, wherein the amount of the zinc salt of methacrylic acid (B) is 10 to 80 parts by weight per 100 parts by weight of the highly saturated rubber.

* * * * *